US012571168B2

(12) United States Patent
Frost et al.

(10) Patent No.: US 12,571,168 B2
(45) Date of Patent: Mar. 10, 2026

(54) INDEPENDENTLY ADJUSTABLE SCREED PLATES

(71) Applicant: AXENOX, LLC., Powell, WY (US)

(72) Inventors: Stuart Anthony Frost, Powell, WY (US); David Michael Frost, Jr., Powell, WY (US)

(73) Assignee: AXENOX, LLC., Powell, WY (US)

( * ) Notice: Subject to any disclaimer, the term of this patent is extended or adjusted under 35 U.S.C. 154(b) by 1018 days.

(21) Appl. No.: 17/706,209

(22) Filed: Mar. 28, 2022

(65) Prior Publication Data

US 2022/0267969 A1     Aug. 25, 2022

Related U.S. Application Data

(63) Continuation-in-part of application No. PCT/US2022/017361, filed on Feb. 22, 2022.

(60) Provisional application No. 63/152,629, filed on Feb. 23, 2021.

(51) Int. Cl.
| | |
|---|---|
| *E01C 19/42* | (2006.01) |
| *G01G 19/08* | (2006.01) |
| *E01C 19/48* | (2006.01) |

(52) U.S. Cl.
CPC .............. *E01C 19/42* (2013.01); *G01G 19/08* (2013.01); *E01C 19/4873* (2013.01); *E01C 2301/10* (2013.01); *E01C 2301/30* (2013.01)

(58) Field of Classification Search
CPC .. E01C 19/42; E01C 19/4873; E01C 2301/10; E01C 2301/30; G01G 19/08
USPC ......................... 404/72, 75, 84.05–84.5, 118
See application file for complete search history.

(56) References Cited

U.S. PATENT DOCUMENTS

| | | | |
|---|---|---|---|
| 7,909,533 B2 | 3/2011 | Quenzi et al. | |
| 7,909,633 B1 | 3/2011 | Miller et al. | |
| 8,221,025 B2 | 7/2012 | Buschmann et al. | |
| 8,825,312 B2 * | 9/2014 | Smieja | E01C 19/48 |
| | | | 701/50 |
| 2010/0284742 A1 * | 11/2010 | Christ | E01C 19/48 |
| | | | 60/420 |
| 2013/0253780 A1 * | 9/2013 | Smieja | E01C 19/48 |
| | | | 701/50 |
| 2014/0186115 A1 * | 7/2014 | Graham | E01C 19/4873 |
| | | | 404/75 |
| 2014/0212217 A1 | 7/2014 | Wagner et al. | |
| 2020/0109525 A1 | 4/2020 | Ligman et al. | |
| 2020/0109572 A1 | 4/2020 | Carli | |

(Continued)

FOREIGN PATENT DOCUMENTS

DE        102012206857 A1 * 10/2013    ............. E01C 19/48

*Primary Examiner* — Raymond W Addie
(74) *Attorney, Agent, or Firm* — ArentFox Schiff LLP

(57)        ABSTRACT

Screed plate assemblies, screed units, and pavers and methods for operating such assemblies, units, and pavers are disclosed. Example assemblies, units, and pavers include a screed plate assembly described herein. Such a screed plate assembly includes a screed plate, sensor(s) and actuator(s). Each sensor is mechanically coupled to the screed plate, and operative to sense a pressure on the screed plate and to communicate the sensed pressure. Each actuator is mechanically coupled to the screed plate, and operative to receive an input related to controlling an angle of attack (AoA) of the screed plate and to control the AoA of the screed plate based on the received input independent of controlling an AOA of another screed plate.

12 Claims, 13 Drawing Sheets

(56)    References Cited

U.S. PATENT DOCUMENTS

| | | | |
|---|---|---|---|
| 2021/0062440 | A1 | 3/2021 | Kappel et al. |
| 2022/0267969 | A1 | 8/2022 | Frost et al. |
| 2022/0412019 | A1* | 12/2022 | Thiesse .................. E01C 19/48 |

* cited by examiner

INDEPENDENTLY ADJUSTABLE SCREED PLATES

CROSS-REFERENCE TO RELATED APPLICATIONS

This application is a continuation-in-part of International Patent Application PCT/US2022/017361, filed Feb. 22, 2022, which claims the benefit of U.S. Provisional Patent Application No. 63/152,629, filed Feb. 23, 2021 and hereby incorporates by reference herein the contents of those applications.

TECHNICAL FIELD

Aspects of the disclosure are directed to systems, methods, and computer program products for paving.

SUMMARY

The following presents a simplified summary of one or more aspects of the technology disclosed herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

According to some aspects, the present disclosure is directed to screed plate assemblies, screed units, and pavers and methods for operating such assemblies, units, and pavers. Example assemblies, units, and pavers include a screed plate assembly described herein. Such a screed plate assembly includes a screed plate, sensor(s) and actuator(s). Each sensor is mechanically coupled to the screed plate, and operative to sense a pressure on the screed plate and to communicate the sensed pressure. Each actuator is mechanically coupled to the screed plate, and operative to receive an input related to controlling an angle of attack (AoA) of the screed plate and to control the AoA of the screed plate based on the received input independent of controlling an AOA of another screed plate.

In some examples, the sensor(s) is/are further operative to communicate the sensed pressure as sensed pressure data via electronic communication. In such examples, the actuator(s) is/are further operative to receive the input as an AoA control command via electronic communication. In such examples, the screed plate assembly (or screed unit, or paver) further includes a computer system. The computer system is in electronic communication with the sensor(s) and the actuator(s) and is operative to receive the communicated sensed pressure data from the sensor(s), determine the AoA control command based on the received sensed pressure data, and transmit the determined AoA control command to the actuator(s).

The methods described herein include methods for operating a screed plate assembly, screed unit, or paver. Such methods include providing a screed plate assembly, screed unit, or paver as described above. Further, such methods include sensing, by each sensor, a pressure on a particular screed plate; communicating, by each sensor, the sensed pressure; receiving, by each actuator, an input related to controlling an angle of attack (AoA) of the particular screed plate; and controlling, by the at least one actuator, the AoA of the particular screed plate based on the received input independent of controlling an AOA of another screed plate.

In some such methods, the sensor(s) is/are further operative to communicate the sensed pressure as sensed pressure data via electronic communication and the actuator(s) is/are further operative to receive the input as an AoA control command via electronic communication. In such methods, the screed plate assembly (or screed unit, or paver) further comprises a computer system. Such computer system is in electronic communication with the at least one sensor and the at least one actuator, and operative to receive the communicated sensed pressure data from the at least one sensor, determine the AoA control command based on the received sensed pressure data, and transmit the determined AoA control command to the at least one actuator. In such methods, communicating includes communicating, by each sensor, the sensed pressure data to the computer system and receiving, by the computer system the communicated sensed pressure data. In such methods, the computer system determines the AoA control command based on the received sensor pressure data, and transmits the determined AoA control command to the at least one actuator.

To the accomplishment of the foregoing and related ends, the one or more aspects of the disclosure comprise the features hereinafter fully described and particularly pointed out in the claims. The following description and the annexed drawings set forth in detail include certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

Features characteristic of aspects if the technology described herein are set forth as follows, in the appended claims, and in the drawings. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings.

DETAILED DESCRIPTION

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

Figure 1:
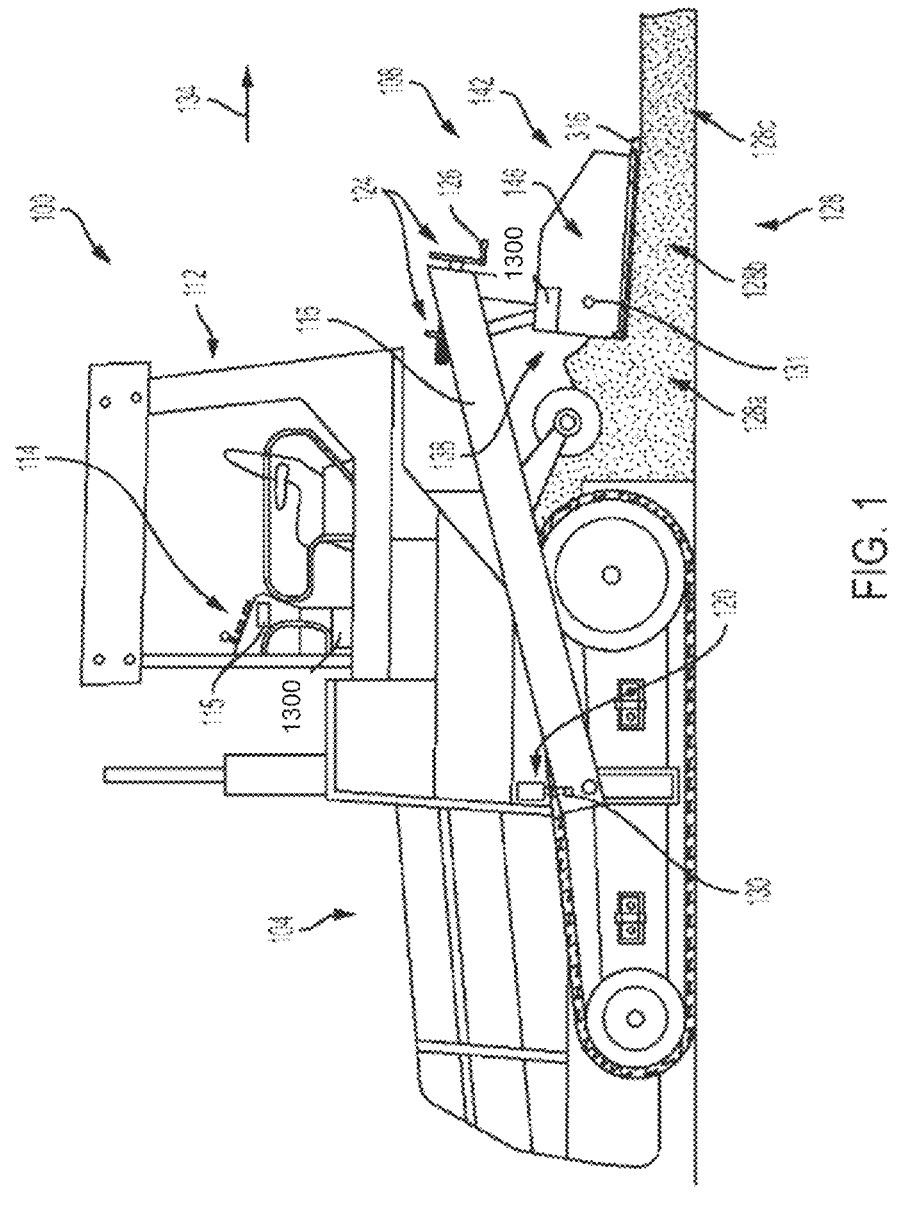
FIG. 1 illustrates a side view of an example road paver, according to the examples of technology disclosed herein.
Figure 2:
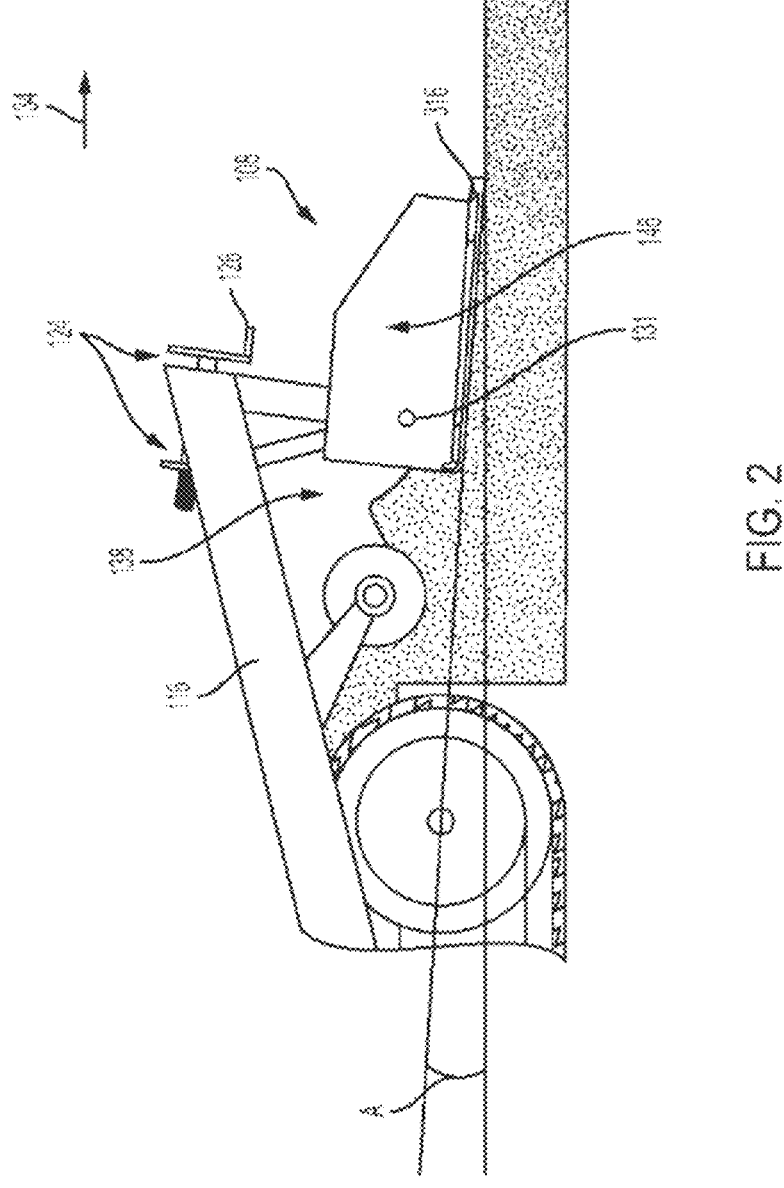
FIG. 2 illustrates a view of an example screed system of the road paver of FIG. 1, according to the examples of technology disclosed herein.

FIGS. 1 and 2 illustrate a road paver 100 according to an aspect of the present disclosure. The road paver 100 includes a tractor 104 and a screed system 108. The tractor 104 may include a hopper, a conveyor system, and an operator cabin 112 that includes operation controls 114. The operator may use the operation controls 114 to drive the road paver 100, actuate various features of the road paver 100, and so forth. The operation controls 114 may include an operator input/output (I/O) interface 115 and the computing system 1300. The operator I/O interface 115 may include input devices such as levers, joysticks, keyboards, voice command inputs, and so forth that allow the operator to input commands or information to the road paver 100. The operator I/O interface 115 may include output devices such as screens, LED indicator lights, auditory alarms, and so forth that are configured to provide information to the operator regarding operation of the road paver 100.

The tractor 104 may be coupled to the screed system 108 via one or more tow arms 116. A hydraulic cylinder 120 may be engaged with the tow arm 116 at a tow point 130 to adjust a position of the screed system 108 relative to the surface to be paved. For example, the hydraulic cylinder 120 may be used to change an angle of attack A of a screed system 108. As used herein, the phrase "angle of attack" (AoA) refers to an angle between the screed plate 316 and the surface to be paved, as shown in FIG. 2. A setting pin 124 may be coupled between the tow arm 116 and the screed system 108. The setting pin 124 may be actuated by an operator (e.g., via the handle 126) to further adjust the angle A between the screed system 108 (containing one or more screed plates 316) and the surface to be paved.

During paving, the paving material 128 is fed from the hopper via the conveyor system in a direction shown by arrow 134 and deposited in front of a front end 138 of the screed system 108. The screed plate 316 of the screed system is configured to spread and compact the paving material along the surface to be paved. As shown schematically at section 128a, the paving material 128 is at its loosest (e.g., least dense, least compact, least level) proximate the front end of the screed system 108. The paving material 128 becomes less loose (e.g., denser, more compact, more level)

as the screed system 108 slides over the paving material 128, as shown schematically at 128b. The paving material 128 is most compact proximate a rear end 142 of the screed system 108, as shown schematically at 128c. The angle of attack A impacts both the density and the grade of the paving material. In some aspects of the disclosure, the angle of attack A may be between 2° and 5°.

Figure 3:
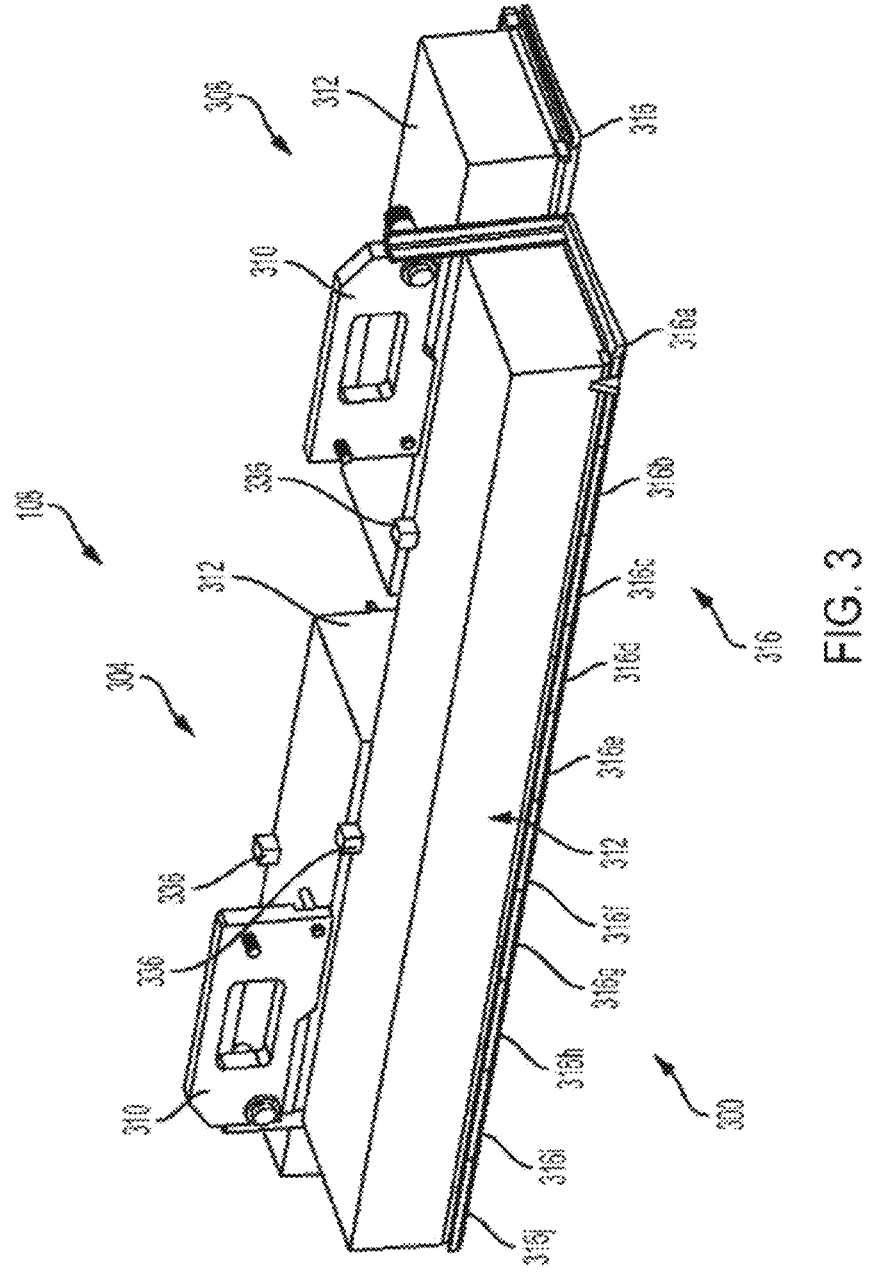
FIG. 3 illustrates the screed system of FIG. 2 with a housing removed, according to the examples of technology disclosed herein.

FIGS. 3-7 illustrate the screed system 108 according to some aspects of the disclosure. FIGS. 3-7 illustrates the screed system 108 with a housing 146 of the screed system 108 removed. As illustrated in FIG. 3, the screed system 108 includes a first screed unit 300, a second screed unit 304, a third screed unit 308, and a frame 310. The frame 310 may be configured to mount the housing 146 over the screed units 300, 304, 308. In some aspects, the screed unit 300 may be stationary relative to the screed system 108. In some aspects, the second screed unit 304 and the third screed unit 308 may be extended or retracted laterally relative to the first screed unit 300. In other aspects of the disclosure, the screed system 108 may include more or fewer screed units. The first screed unit 300, the second screed unit 304, and the third screed unit 308 are substantially similar so only the first screed unit 300 is described in detail herein. Corresponding parts between the first screed unit 300, the second screed unit 304, and the third screed unit 308 are shown using like numbers.

Figure 4:
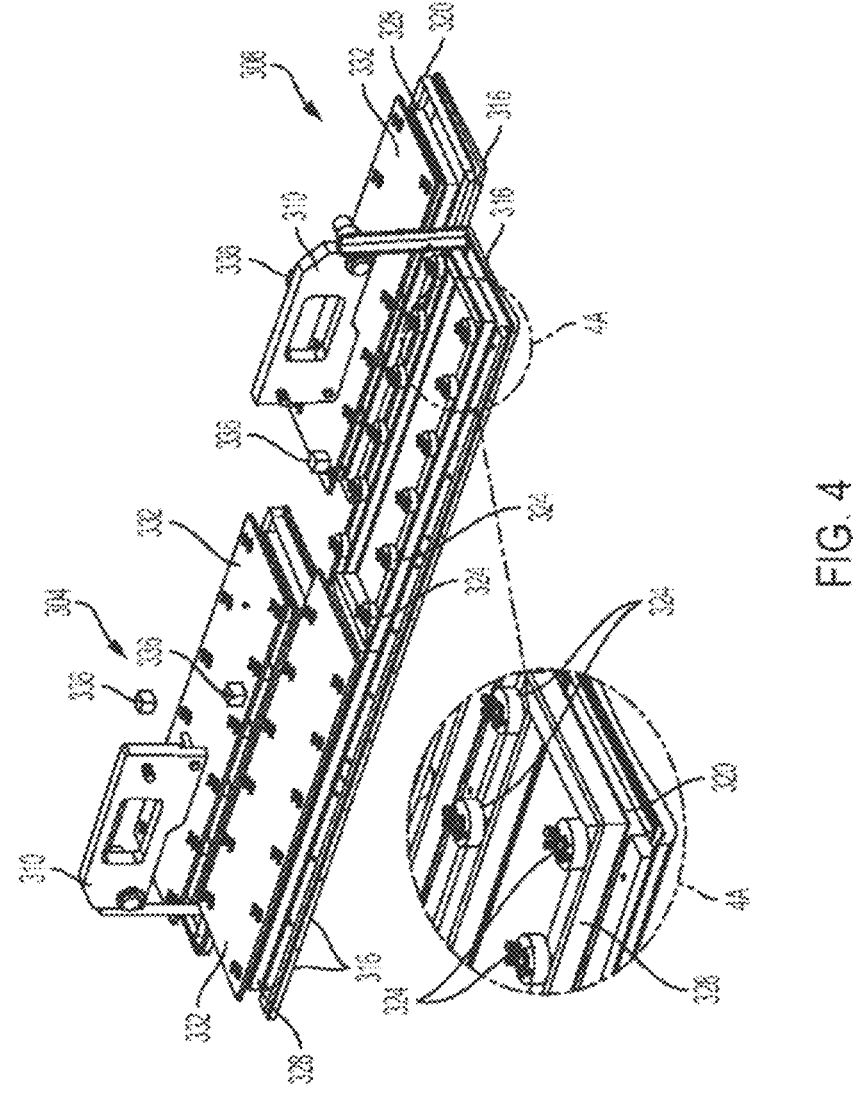
FIG. 4 illustrates the screed system of FIG. 3 with further housings removed, according to the examples of technology disclosed herein.

As shown in FIGS. 3 and 4, the screed unit 304 may include a housing 312, a plurality of screed plates 316, a mounting plate 320 having heating elements (not shown), a plurality of pressure sensors 324, support walls 328, a support plate 332, and an indicator 336. The screed plates 316 may be configured to engage the paving material 128 dispensed from the road paver 100 to spread and level the paving material 128 along the surface to be paved. In some aspects of the disclosure, the bottom surface (e.g., the surface configured to contact the paving material) may include a pattern or a texture, such as a repetitive wave form pattern, a repetitive V-shaped pattern, a repetitive block shaped pattern, or a variably shaped wave pattern. In some aspects of the disclosure, the screed plates 316 include a plurality of modular individual screed plates 316a, 316b . . . . 316j, as illustrated in FIG. 3. In other aspects of the disclosure, the screed plate 316 may be a single screed plate. The mounting plate 320 having the heating elements may be coupled to the screed plate(s) 316 and is configured to heat the screed plate(s) 316. Heating a screed plate 316 prevents hot paving material from sticking to the screed plate 316 as well as maintaining a raised temperature during paving to not prematurely cool the paving material 128. In some aspects of the disclosure, the heating elements may be electric heating elements that are powered by a power source of the tractor 104.

Figure 5:
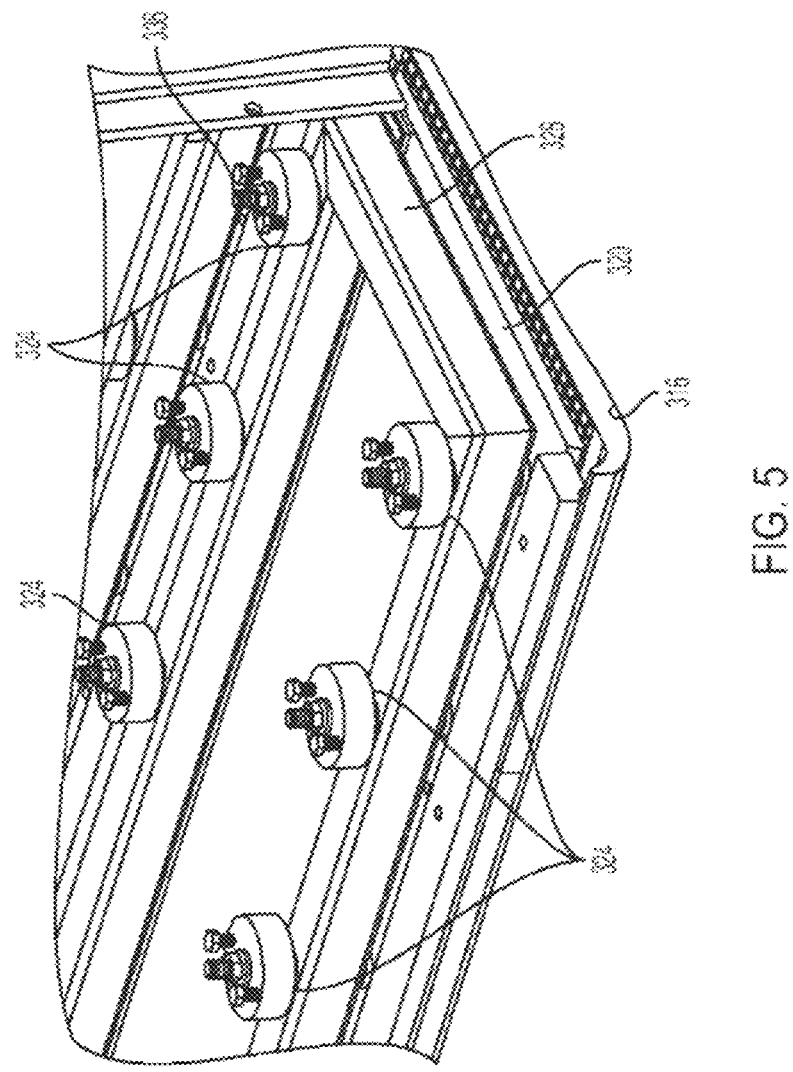
FIG. 5 illustrates a detail view of pressure sensors engaged with screed plates of the screed system of FIG. 4, to the examples of technology disclosed herein.
Figure 6:
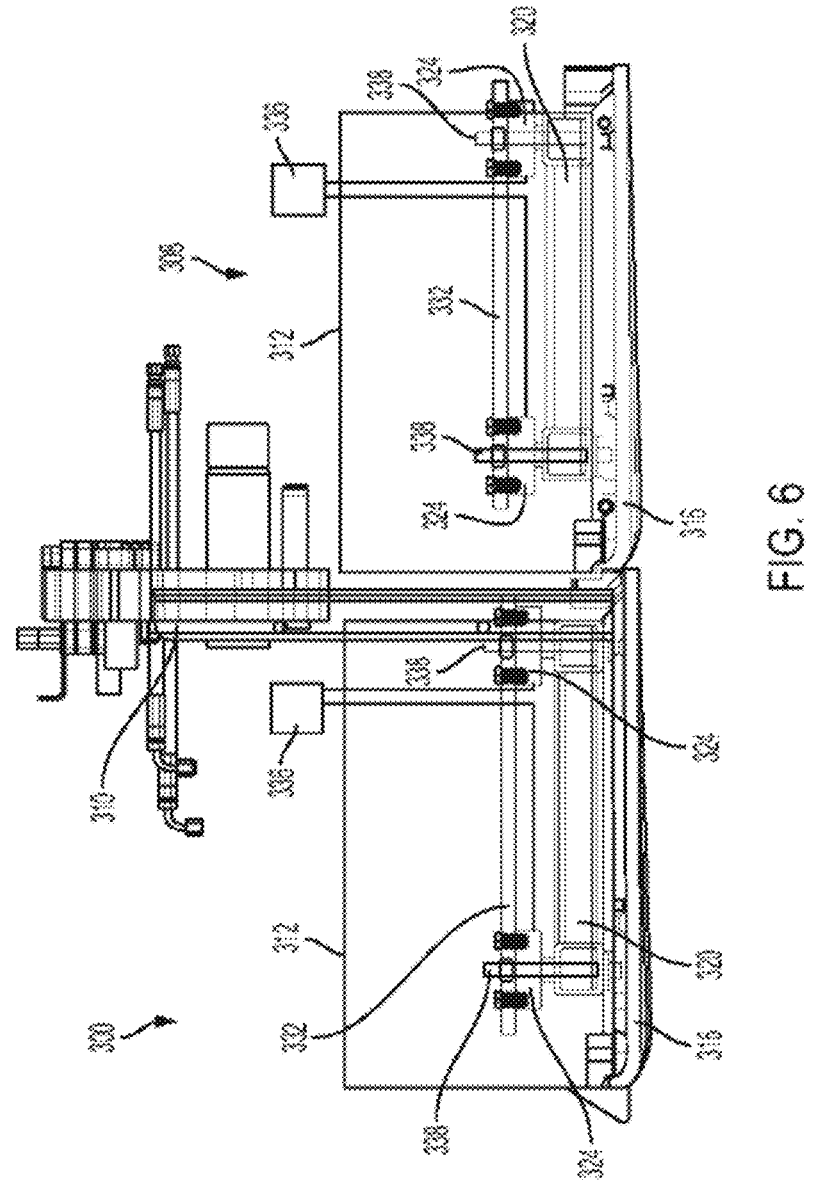
FIG. 6 illustrates a side view of the screed system of FIG. 3, according to the examples of technology disclosed herein.

As is best shown in FIGS. 5 and 6 and inset 4A in FIG. 4, in some aspects the mounting plate 320 may be coupled to the support walls 328 and the support plate 332 by a plurality of bolts 338. The screed plate 316 can also be coupled to the support walls 328 by the plurality of bolts 338, or the screed plate 316 can be releasably secured to the mounting plate 320. A plurality of springs (not shown) may be positioned between the screed plate 316 and the support plate 332 so that the screed plate 316 may float above the paving material. A plurality of pressure sensors 324 may be coupled between the screed plate 316 and the support plate 332. In some aspects of the disclosure, the pressure sensors 324 may be positioned between the housing 312 and the frame 310. In some aspects of the disclosure, the pressure sensors 324 may be engaged with the bolts 338. The pressure sensors 324 may be configured to sense a pressure indicative of a weight of the screed plate 316. In some aspects of the disclosure, the pressure sensors 324 may be positioned in other locations above the screed plate 316. For example, the pressure sensors 324 may be positioned above or below the support plate 332, the frame 310, and so forth. In aspects that include the heating elements, the pressure sensors 324 may be positioned above the screed plate 316 and the mounting plate 320, which includes the heating elements. The pressure sensors 324 may be configured to transmit pressure information to the computing system 1300.

As described in greater detail below, the computing system 1300 may be configured to determine a weight or pressure distribution of the screed plate 316 based on the pressure sensed by the pressure sensors 324. The computing system 1300 may then be configured to determine the angle of attack A of the screed plate 316 based on the pressure distribution of the screed plate 316. In some aspects of the disclosure, the pressure sensors 324 may include load cells, strain gauge pressure sensors, potentiometric pressure sensors, inductive pressure sensors, capacitive pressure sensors, piezoelectric pressure sensors, variable reluctance pressure sensors, and/or one or more hydraulic pistons with coupled to a hose that is in turn coupled to an electronic pressure gauge. The computing system 1300 may be configured to change the angle of attack A based on the pressure distribution of the screed plate 316 during paving. In some aspects, the computing system may be configured to dynamically change the angle of attack A in real-time or substantially real-time during paving.

Figure 7:
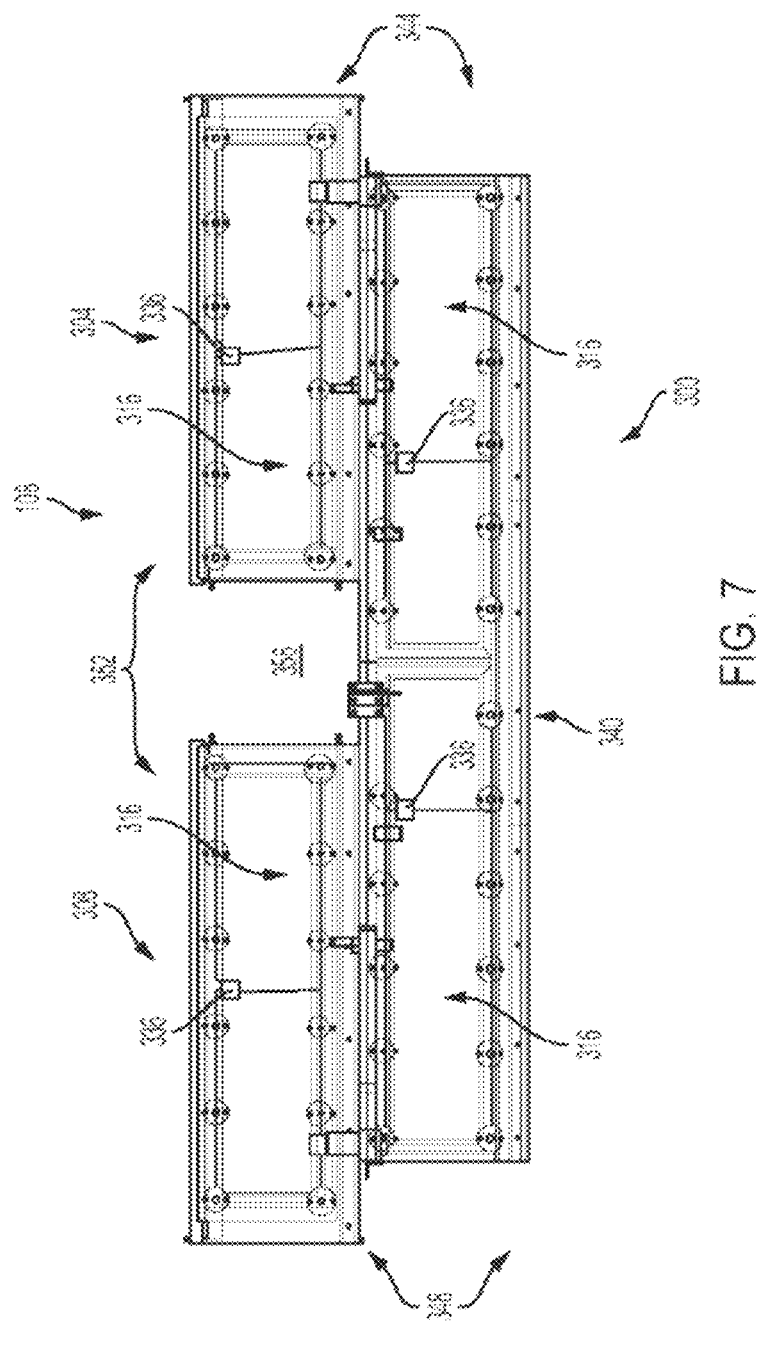
FIG. 7 illustrates a top view of the screed system of FIG. 3, according to the examples of technology disclosed herein.

FIG. 7 illustrates a top view of the screed system 108 with the housing 146 removed. As is best shown in FIG. 7, in some aspects of the disclosure, the pressure sensors 324 may be positioned to determine at least a pressure at or proximate a right side 344 of the screed system 108, a pressure at or proximate a left side 348 of the screed system 108, a pressure at or proximate a front side 340 of the screed system 108, and a pressure at or proximate a rear side 352 of the screed system 108. In some aspects of the disclosure, the pressure sensors 324 may also be positioned to determine at least a pressure at or proximate a center 356 of the screed system 108. In some aspects of the disclosure, the pressure sensors 324 may be positioned to determine at least a pressure at or proximate the front side of the screed plate 316 and a pressure at or proximate the rear side 352 of the screed system 108. In some aspects of the disclosure, the pressure sensors 324 may be positioned to determine at least a pressure at or proximate a first side of the screed plate 316 and a pressure at or proximate a second side of the screed plate 316. In such aspects, the second side is opposite the first side.

As is described in greater detail below, a computer system 1300 may generate a screed plate repositioning control signal configured to reposition the screed system 108 based on the pressure determined by the pressure sensors 324. For example, the computer system 1300 may command an actuator such as the hydraulic cylinder 120 to reposition the tow arms 116 in response to the determined pressure indicating that the pressure at or proximate the front side 340 or the rear side 352 of the screed system 108 exceeds a predefined pressure threshold. In another example, the computer system 1300 notify the operator, via the I/O interface 115, that the pressure of second screed unit 304 are the third screed unit 308 different in response to determining that the pressure at the second screed unit 304 is different than pressure at the third screed unit 308. The notification may prompt the operator to reposition the second screed unit 304 or the third screed unit 308 so that the pressures of the second and third screed units 304, 308 are similar. In yet another example, the computer system 1300 may notify the operator, via the operator I/O interface 115, that the pressure of the second and third screed units 304, 308 is greater than the pressure at the first screed unit 300. The notification may prompt the operator to lift the second screed unit 304 or the third screed unit 308 so that the pressures of the first, second, and third screed units 300, 304, 308 are similar.

In some aspects of the disclosure, the indicator 336 may be coupled to the pressure sensors 324. The indicator may be configured to display information indicative of a status of the screed plate 316 to the operator. For example, the indicator 336 may be a LED indicator configured to light up or turn color in response to determining that the screed plate 316 should likely be repositioned, an audio indicator configured to emit an alarm sound in response to determining that the screed plate 316 should likely be repositioned, and so forth. In another example, the indicator 336 may be a screen configured to illustrate the actual pressures determined by the pressure sensors 324, an animation illustrating the pressure distribution across the screed plate 316, an indication that the determined pressures are within limits, out of limits (e.g., that the screed plate 316 should be repositioned), and so forth. In some aspects of the disclosure, the indicator 336 may be represented in a user interface or user control panel in the operator cabin 112 of the road paver 100 so that the operator can adjust the angle of attack A based on the readings from the indicators 336.

Although the indicator 336 is described with respect to the screed plate 316, the indicator 336 may also display similar information with respect to each of the screed units 300, 304, 308. In some aspects of the disclosure, the indicator 336 may display a notification may prompt the operator to reposition the second screed unit 304 or the third screed unit 308 as described above.

As described above, screed system 108 can be adjusted as a whole (for both AoA of the screed plates 316 and height of the paved surface) in at least two ways. First, the screed system 108 can be adjusted by using the hydraulic cylinder 120 (e.g., under control of the operator via operator controls 114) to raise or lower the tow arm 116, thus raising/lowering the entire screed system 108. Second, the screed system 108 can be adjusted using the setting pin 124 assembly and handle 126 that can change the AoA of the screed system 108.

In some circumstances, the surface to be paved is not uniform laterally across the direction of travel of the paver (as opposed to uniform longitudinally, i.e., parallel to direction 134). For example, a surface to be paved can include tire ruts and corresponding bumps generally parallel to the road paver 100 direction of travel. In certain examples of the technology disclosed herein, individual screed plates are independently adjustable (in at least AoA) to mitigate paving irregularities resulting from irregularities in the surface to be paved.

Figure 8:
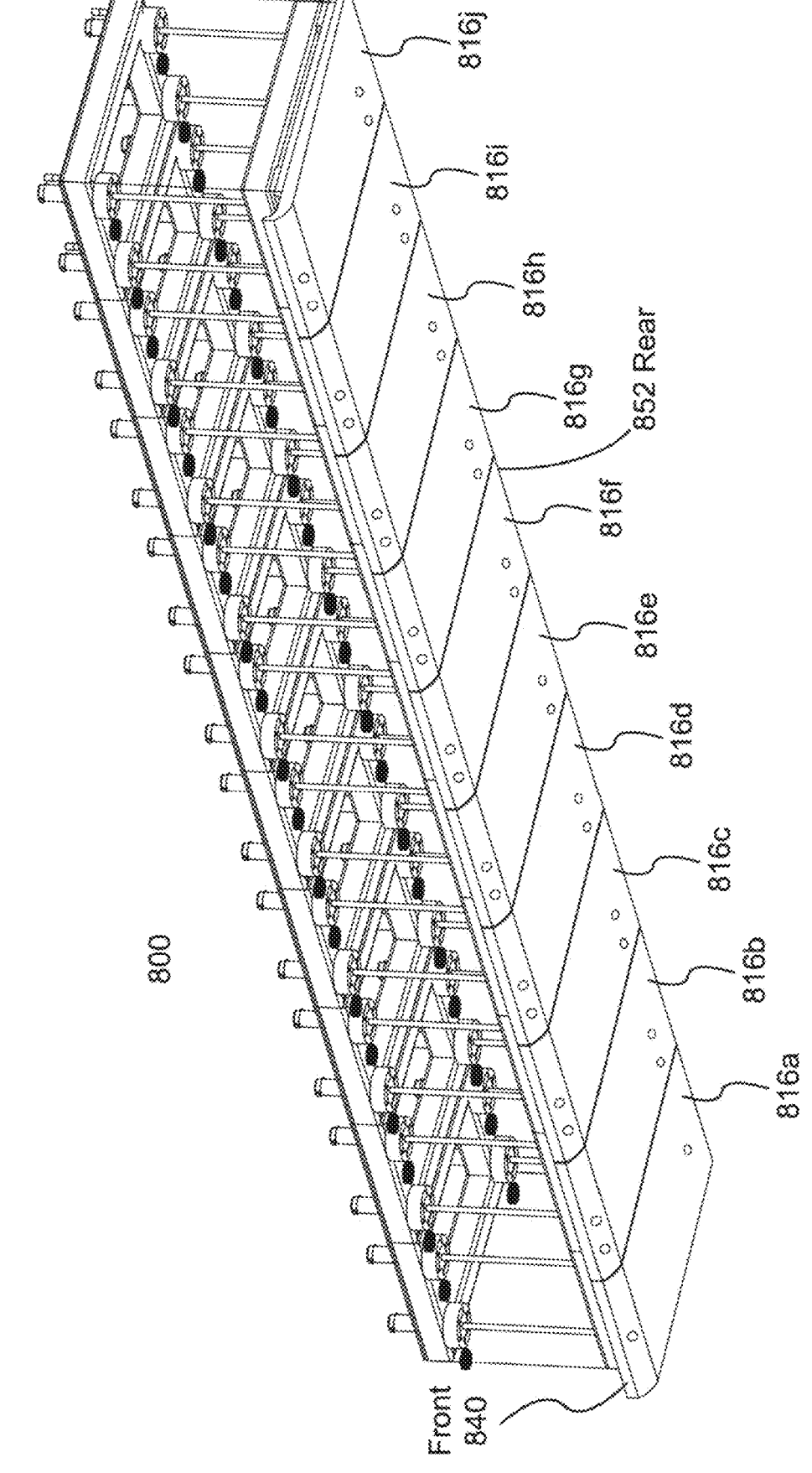
FIG. 8 illustrates a screed unit, according to the examples of technology disclosed herein.
Figure 10:
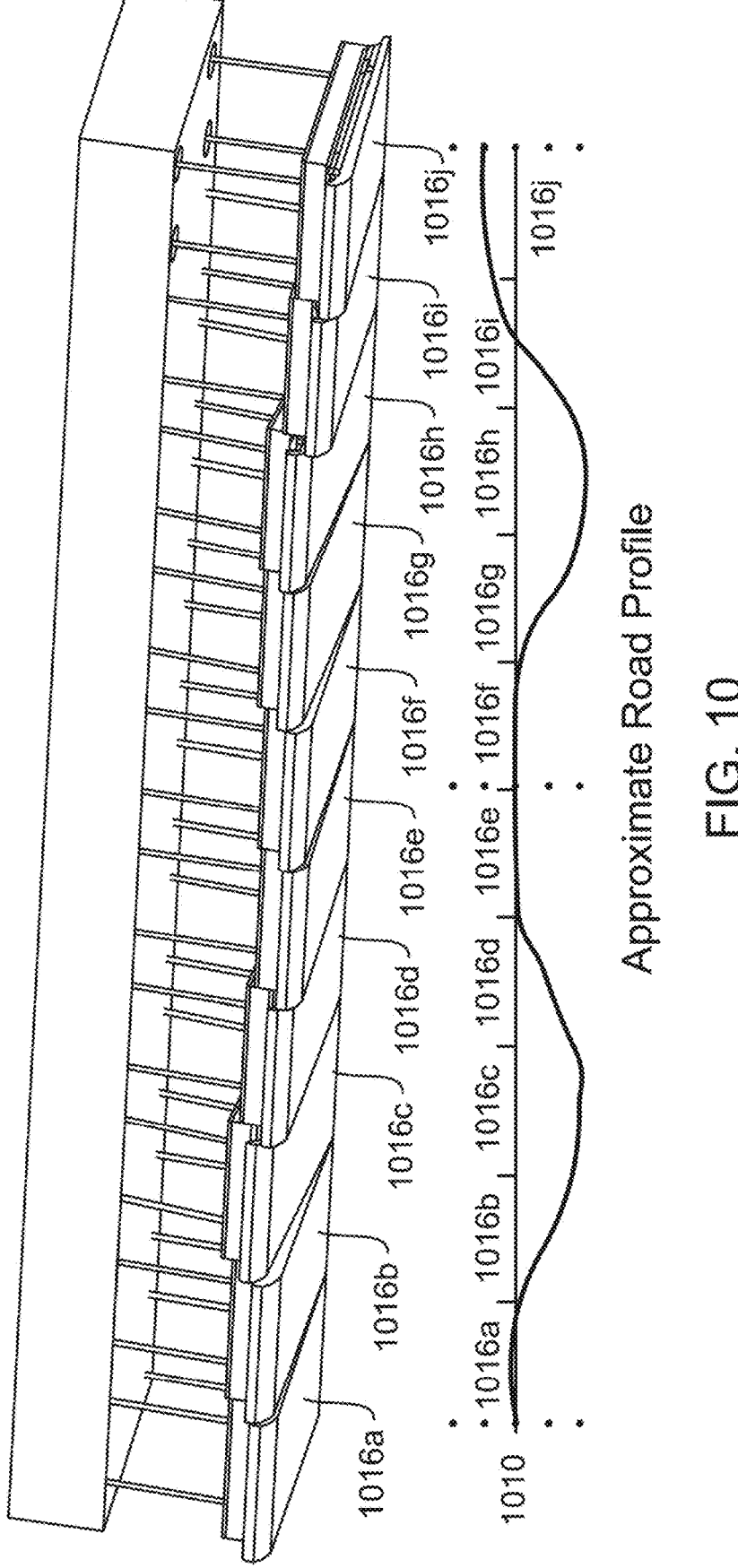
FIG. 10 illustrates an example screed unit adjusted to respond to an example road profile, according to the examples of technology disclosed herein.

Consider, as continuing example, paving a 2" (average) mat of paving material 128 with a 10' screed unit 300 on a 10' wide road section characterized by a set of tire ruts and an edge bump—illustrated as an approximate road profile 1010 in FIG. 10. Referring to FIG. 8, and continuing to refer to prior figures for context, screed unit 800 includes ten (10) one foot (1') wide independently adjustable screed plates 816a-816j. During paving, the total weight of a screed unit 800 is supported by the underlying mat of paving material 128b. Without lateral control of individual screed plates 816, the paving material 128b on the bump will carry more than a proportional share of the weight of the screed unit 800 and the paving material 128b in the ruts will carry less of than a proportional share of the weight of the screed unit 800. As a result, the paving material 128c will be less dense in the ruts and denser over the bump.

While 1' wide screed plates 816 are used in the continuing example, both narrower and wider screed plates 816 with individually controlled pitch (AoA), roll, and yaw can be used. In the continuing example, only AoA (pitch) control is discussed, and the rear 852 of each plate 816 forms a substantially continuous line across the back of the screed unit 800, while the front 840 of each plate 816 can be individually adjusted for a desired AoA.

Preferably, a screed plate 816 over a rut will have a greater AoA than nominal, and a screed plate 816 over a bump will have a lesser AoA than nominal. Such an approach pushes more paving material 128 into the ruts and less over the bumps, thus mitigating paving irregularities—possibly to the extent that subsequent rolling of the surface can reduce irregularities further.

Figure 9:
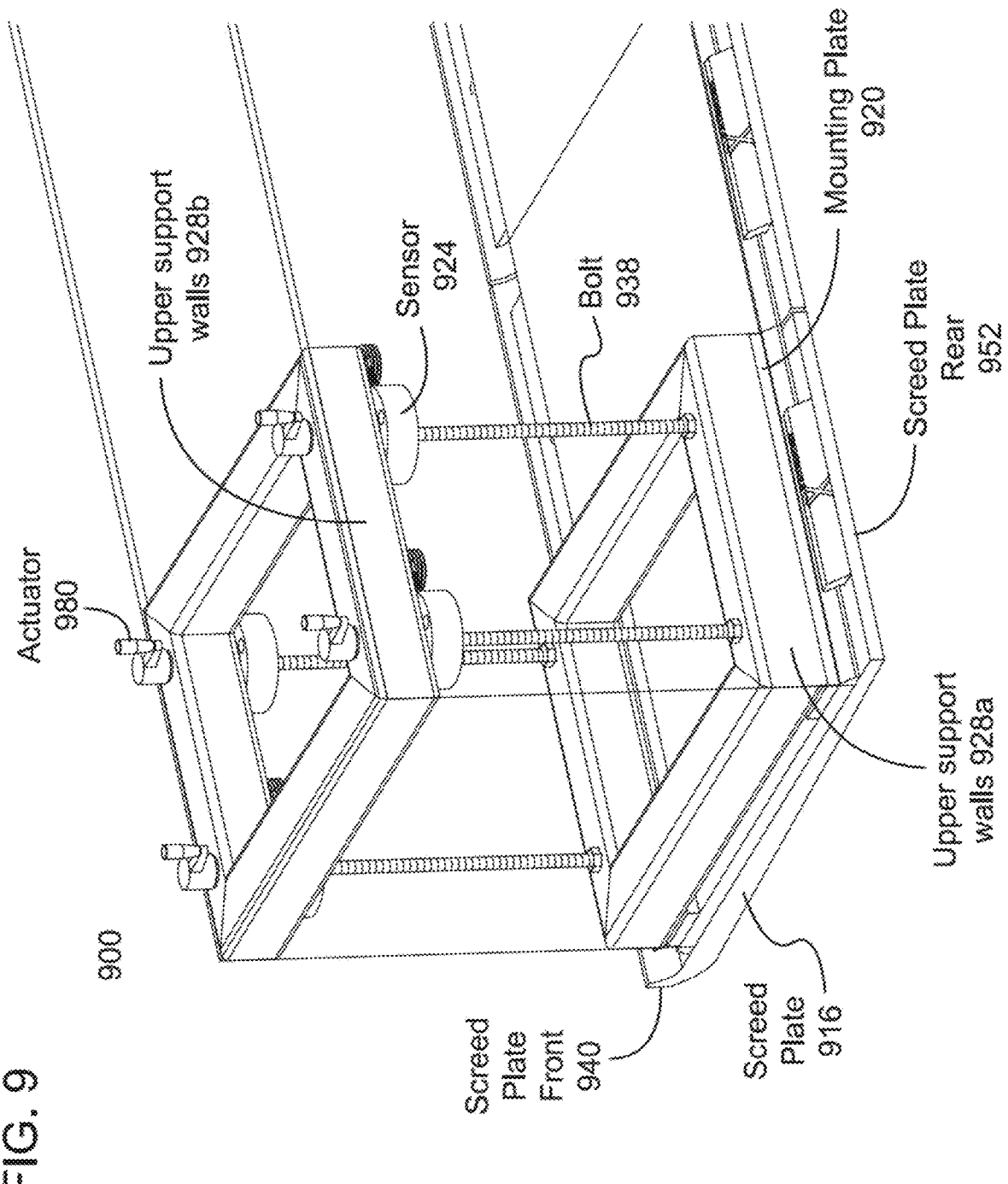
FIG. 9 illustrates a screed plate assembly, according to the examples of technology disclosed herein.

Referring to FIG. 9, and continuing to refer to prior figures for context, an example individually adjustable screed plate assembly 900 is shown. In such a screed plate assembly 900, screed plate 916 (e.g., screed plate 816) is mounted to a mounting plate 920, and mounting plate 920 is connected to lower support walls 928a using bolts 938— akin to the screed unit 300. The bolts 938 can be used to adjust the pitch (AoA), roll, and yaw of the screed plate 916. As an alternative to the support wall 328 structure used in screed unit 300, bolts 938 also connect to upper support walls 928b, in this case through sensors 924 (e.g., sensors 324). Not shown are 1) the connection of support walls 928a, 928b to a frame akin to frame 310, 2) the connection of a housing (e.g., housing 312) to the frame, and 3) a conductor plate.

The screed plate assembly 900 of FIG. 9 uses four (4) sensors 924—two (2) positioned over the lower support walls 928a at the screed plate front 940, and two positioned over the lower support walls 928a at the screed plate rear 952. Other examples can use a different number of sensors 924 in different positions—including other than co-axial with a bolt 938 as shown. For example, one front sensor 924 only, one sensor 924 per support wall 928. Measuring pressure at the screed plate rear 952 can be used to determine pressure differences from screed plate front 940 to screed plate rear 952. As with the example of FIG. 3, sensors 924 are discrete electronic sensors that measure pressure/weight. Other examples can include distributed pressure sensors, e.g., conductors that change resistance under pressure. In each example, sensed pressure is used to determine an AoA for the screed plate 916. In some examples, data from the sensors 924 (or information derived from such sensor data) can be used as described below to adjust the pitch (AoA), roll, and yaw of the screed plate Each example screed plate assembly 900 includes one actuator 980 per bolt. Each actuator 980 can be used to adjust the pitch (AoA), roll, and yaw of the screed plate 916 based on sensor data (and on other data as described below) using its associated bolt 938. In the present example, actuator 980 is a manual actuator, and sensor data is presented to the operator (e.g., via I/O interface 115, via indicators 136) to allow manual adjustment of screed plate 914 AoA. In other examples, actuator 980 can include a servo, a turnbuckle, one or more cams, a screwjack, a hydraulic cylinder, and a lever. In non-manual examples, the actuator 980 is controlled based on an AOA determined for each screed plate 916 by computer system 1300 based on sensor 924 data for the specific screed plate 916. In some examples, screed plate AoA can be actuated by pressure feedback alone, e.g., a spring (or torsion bar in the lateral pivot), subject to pressure on the front of the screed plate to hold the front end of the screed plate up, unless pivoted down by the portion of the screed plate aft of the lateral pivot (e.g., when that aft portion hits a bump; or pivoted up by the portion of the screed plate aft of the lateral pivot (e.g., when that aft portion hits a rut).

In the example of FIG. 9, four actuators 980 can adjust each bolt 938 (and hence both AoA and lateral angle) to effectively adjust the overall vertical position of the screed plate 916, e.g., to compensate for differential wear across the smaller screed plates. For example, a worn-out screed plate (e.g., ½" thick nominal, but worm to ⅛") can be replaced with a new ½" screed plate between two semi-worn (e.g., ¼" remaining) screed plates. The technology disclosed herein can adjust the new screed plate ¼" higher to be even with the ¼" inch remaining screed plates. This might self-adjust if based on pressure, or the paver 100 can zeroize/null all plates to a flat surface. In the example of FIG. 9, actuator along the screed plate rear 952 keep a common pivot axis laterally proximate the screed plate rear 952.

In some examples, information other than pressure/weight on one or more portions of a screed plate 916 can be used to inform the height, pitch (AoA), roll, and yaw of the screed plate 916. For example, detailed geo-location based topographs of the surface to be paved (e.g., acquired after a survey of the surface in conjunction with milling) can be used by the paver 100 to determine (e.g., using computer 1300) adjustments to one or more of the pitch (AoA), roll, and yaw of each individually controlled screed plate assembly 900. Electromagnetic (EM), sonar, or mechanical sensors can be used ahead of the screed units 300—for example, the surface to be paved can be profiled by a set of mechanical sensors using a downward-biased wheel on an arm. This data can be used to command the actuators 980 to adjust the AoA of each individually controlled screed plate 916. Combinations of the above sensors can also be used.

Figure 11:
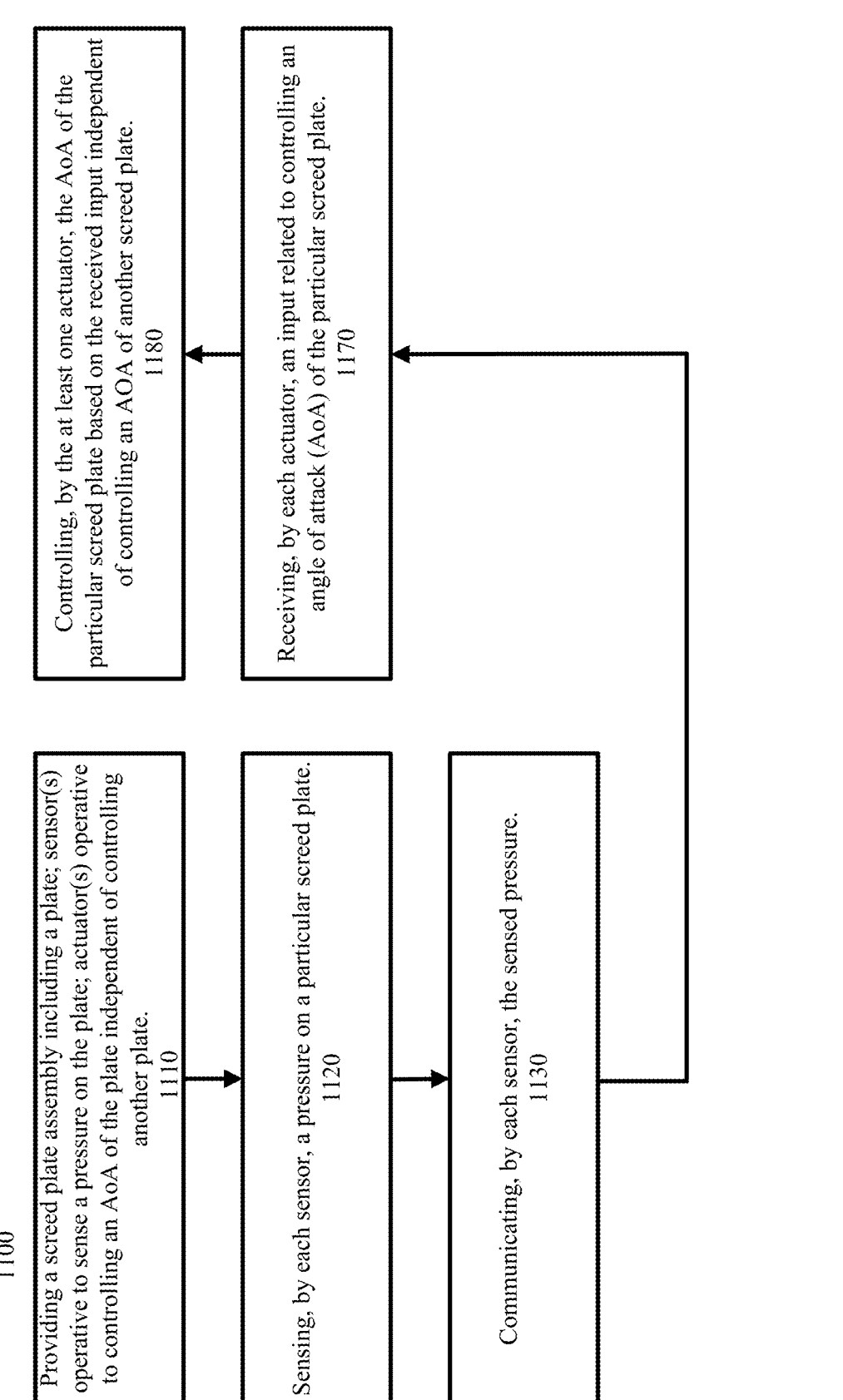
FIG. 11 is an example flowchart of a method, according to the examples of technology disclosed herein.
Figure 12:
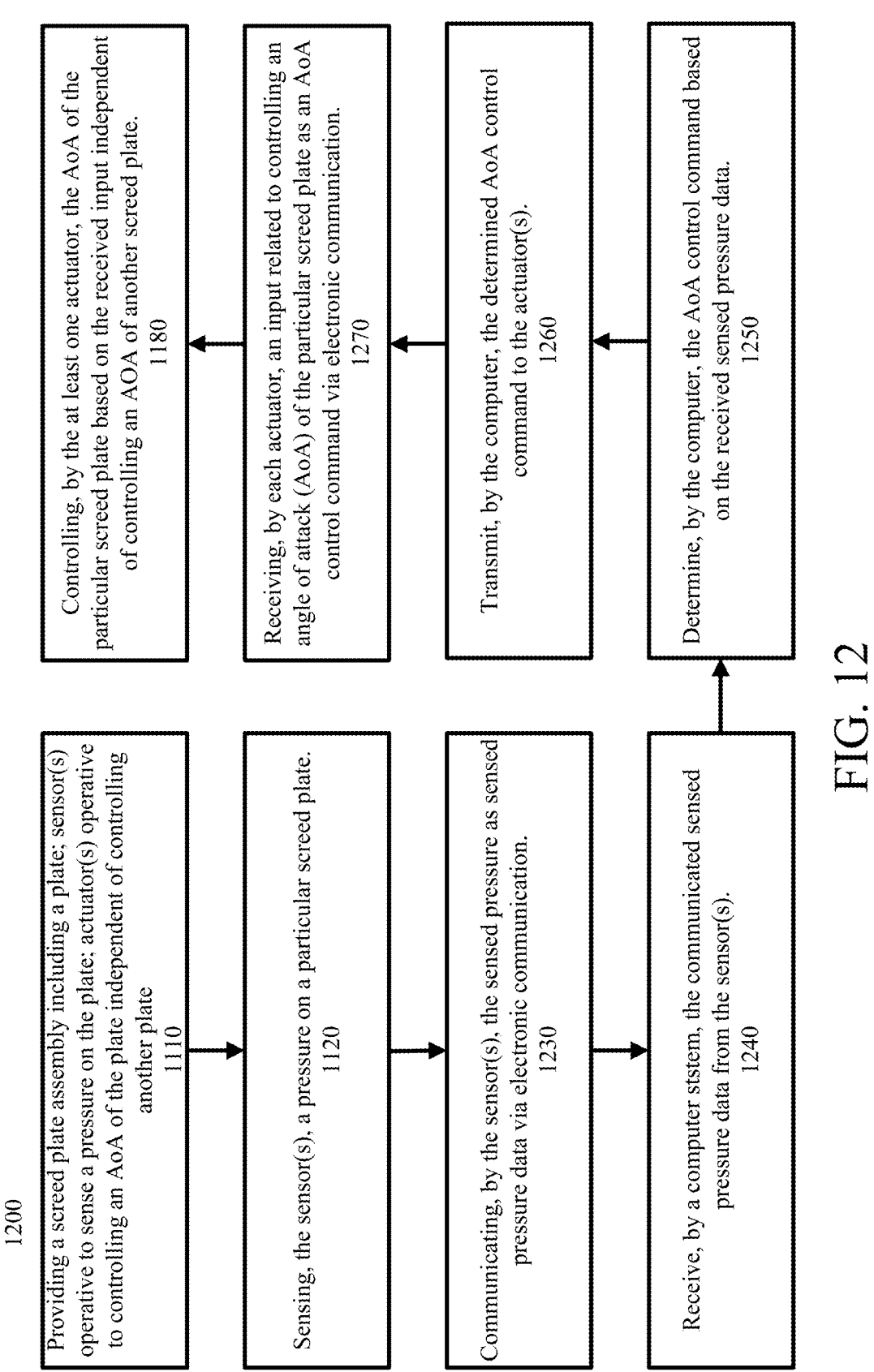
FIG. 12 is an example flowchart of a method, according to the examples of technology disclosed herein.

Referring to FIG. 10, FIG. 11, and FIG. 12, and continuing to refer to prior figures for context, a further example of a screed unit 1000 including ten screed plate assemblies 1016a-1016j is shown adjusted in accordance with method 1100 and method 1200 to respond to lateral road profile 1010. Lateral profile 1010 represents a rutted un-milled lane of an old road surface with a bump on the left side.

A screed unit 1000 (similar to screed unit 800) is provided—the screed unit includes a frame such as frame 310 (not shown) and a plurality of screed plate assemblies 1016a-1016j (similar to screed plate assembly 900)—Block 1110. In the further example, each screed plate assembly 1016 is attached to the frame 310. Each screed plate assembly 1016 includes a screed plate 916, at least one sensor 924 (four sensors in the further example), and at least one actuator 980 (four actuators in the further example). Each sensor 924 is mechanically coupled to the screed plate 916 via bolts 938. Each sensor 924 is operative to sense a pressure on the screed plate 916 and to communicate the sensed pressure. Each actuator 980 is mechanically coupled to the screed plate 916. Each actuator 980 is operative to receive an input related to controlling an angle of attack (AoA) of the screed plate 916, and to control the AoA of the screed plate 916 based on the received input independent of controlling an AOA of another screed plate.

Each sensor 924 senses a pressure on a particular screed plate—Block 1120. In the further example, the bottom of each of screed plate assembly 1016a-1016j is under pressure from the paving material 128 (not shown) as the screed unit 1000 encounters the profile 1010 under the screed unit 1000. Each sensor 924 communicates the sensed pressure—Block 1130. In some other examples (e.g., such as examples in which a screed plate AoA is adjusted manually), such communication is via an indicator 336 unique to a given screed plate assembly 1016.

Each actuator 980 receives an input related to controlling an angle of attack (AoA) of the particular screed plate—Block 1170. In some other examples, after noticing an indicator 336 indicating the need for AoA adjustment for a particular single screed plate, an operator manually adjusts the single screed plate as the input. Each actuator controls the AoA of the particular screed plate based on the received input independent of controlling an AOA of another screed plate—Block 1180. Such control can be, for example, by turning bolts 938 an amount to adjust the AoA.

In the further example, as described in FIG. 12, Block 1110 is performed as described above with respect to FIG. 11. In the further example, the sensor(s) communicates the sensed pressure as sensed pressure data via electronic communication—Block 1230. Such communication can be one, or a combination of, wired and wireless communication.

In the further example, the provided screed plate assembly further includes a computer system, such as computer system 1300. Not that elements of the computer system 1300 can be in the screed unit 1000 itself, on the overall screed system 108, and on the tractor 104 (e.g., in the cabin 112). The computer system 1300 is in electronic communication with the at least one sensor 924 and the at least one actuator 980, and is operative to receive the communicated sensed pressure data from the at least one sensor 924, determine the AoA control command based on the received sensed pressure data, and transmit the determined AoA control command to the at least one actuator 980. In such examples, the computer system 1300 receives the communicated sensed pressure data from the sensor(s) 924—Block 1240.

The computer system 1300 determines the AoA control command based on the received sensor pressure data—Block 1250. For example, a lookup table can be used to map the received pressure sensor data to an AoA control command. As another example, an equation can be used to related an AoA control command to sensed pressure data. As another example, hysteresis can be employed in transform from sensed pressure data to AoA command. Readings from multiple sensors 924 of known positions can for a profile of pressure at various points around the screed plate assembly 1016, and the profile can be used in determining the AoA command. Once the AoA control command is determined, the computer 1300 transmits the determined AoA control command to the actuator(s)—Block 1260. Each actuator 980, whether directly, peer-to-peer, or via a hub, receives the command related to controlling an angle of attack (AoA) of the particular screed plate via electronic communication—1270. In the further example, the actuator(s) is further operative to receive the input as an AoA control command via electronic communication. Again, such communication can be one, or a combination of, wired and wireless communication. The actuator(s) 980 then control the AoA of each screed plate 916 based on the received command independent of controlling an AOA of another screed plate, e.g., as described above in conjunction with Block 1180.

Figure 13:
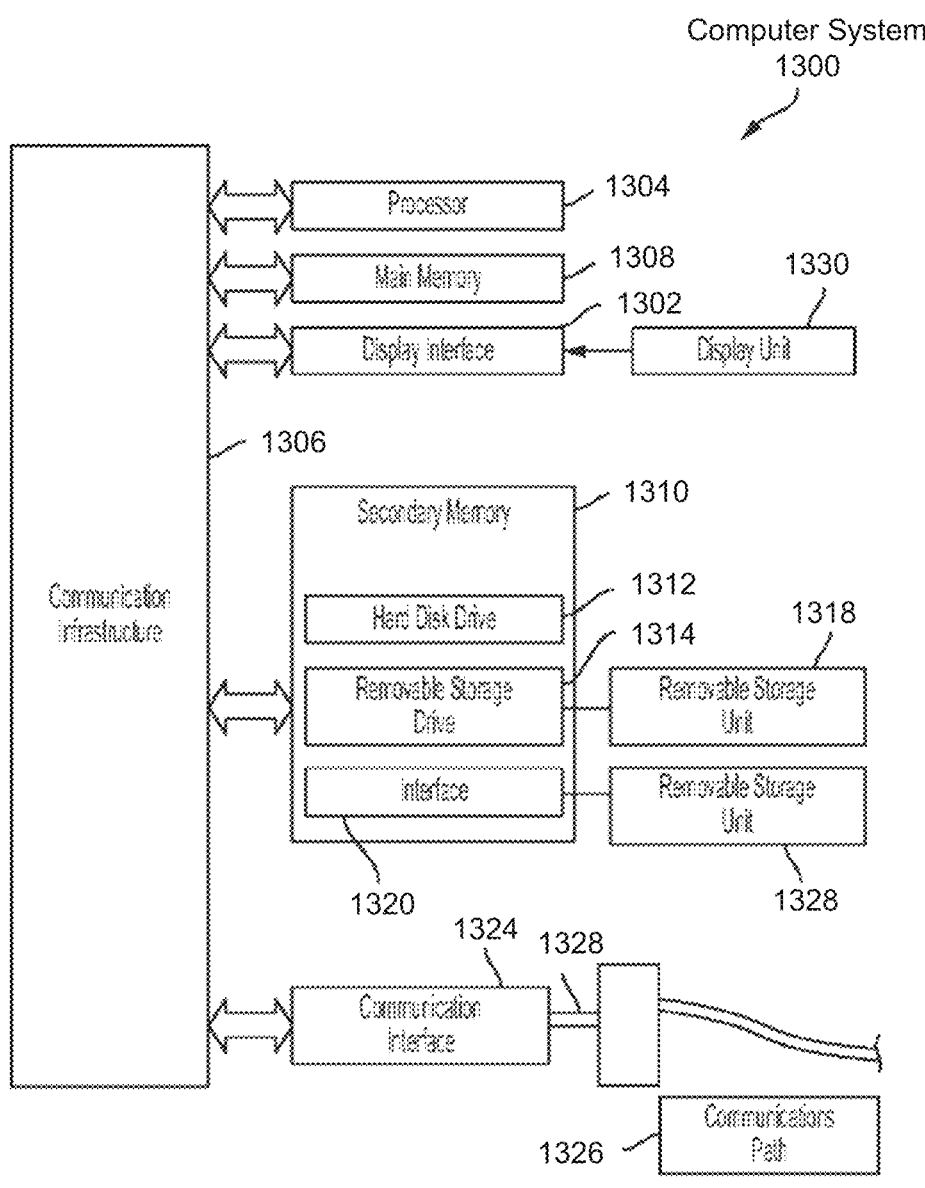
FIG. 13 illustrates an example system diagram of various hardware components and other features for use to the examples of technology disclosed herein.

Aspects of the disclosure may be implemented using hardware, software, or a combination thereof and may be implemented in one or more computer systems or other processing systems. In one aspect, the disclosure is directed toward one or more computer systems capable of carrying out the functionality described herein. FIG. 13 presents an example system diagram of various hardware components and other features that may be used in accordance with aspects of the disclosure. Aspects of the disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 1300 is shown in FIG. 13. In some aspects of the disclosure, the computer system 1300 may be positioned in the operator cabin 112. In some aspects of the disclosure, the computer system 1300 may be positioned within the screed system 108.

The computer system 1300 includes one or more processors, such as a processor 1304. The processor 1304 is connected to a communication infrastructure 1306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

The computer system 1300 may include a display interface 1302 that forwards graphics, text, and other data from the communication infrastructure 1306 (or from a frame buffer not shown) for display on a display unit 1330. The computer system 1300 also includes a main memory 1308, preferably random-access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well-known manner. The removable storage unit 1318, represents a floppy disk, magnetic tape, optical disk, etc., which is read by and written to removable storage drive 1314. As will be appreciated, the removable storage unit 1318 includes a computer usable storage medium having stored therein computer software and/or data.

In alternative aspects, the secondary memory 1310 may include other similar devices for allowing computer programs or other instructions to be loaded into computer system 1300. Such devices may include, for example, a removable storage unit 1322 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1322 and interfaces 1302, which allow software and data to be transferred from the removable storage unit 1322 to the computer system 1300.

The computer system 1300 may also include a communications interface 1324. The communications interface 1324 allows software and data to be transferred between the computer system 1300 and external devices. Examples of the communications interface 1324 may include a modem, a network interface (such as an Ethernet card), a communications port, a Personal Computer Memory Card International Association (PCMCIA) slot and card, etc. Software and data transferred via the communications interface 1324 are in the form of signals 1328, which may be electronic, electromagnetic, optical or other signals capable of being received by the communications interface 1324. These signals 1328 are provided to the communications interface 1324 via a communications path (e.g., channel) 1326. This path 1326 carries signals 1328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1380, a hard disk installed in the hard disk drive 1370, and signals 1328. These computer program products provide software to the computer system 1300. Aspects of the disclosure are directed to such computer program products.

Computer programs (also referred to as computer control logic) are stored in the main memory 1308 and/or the secondary memory 1310. Computer programs may also be received via the communications interface 1324. Such computer programs, when executed, enable the computer system 1300 to perform various features in accordance with aspects of the disclosure, as discussed herein. In particular, the computer programs, when executed, enable the processor 1304 to perform such features. Accordingly, such computer programs represent controllers of the computer system 1300.

In variations where aspects of the disclosure are implemented using software, the software may be stored in a computer program product and loaded into the computer system 1300 using the removable storage drive 1314, the hard drive 1312, or the communications interface 1320. The control logic (software), when executed by the processor 1304, causes the processor 1304 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

During operation of the road paver 100, the paving material may be dispensed from the hopper, via the conveyor system, proximate the front 138 of the screed system 108. The screed plate 316 may engage the paving material, and spread, level, and compact the paving material as the screed system 108 travels over the paving material 128. The angle of attack A of the screed plate 316 may determine an amount of compaction (e.g., a density) of the paving material 128, a grade of the paving material 128, etc. The pressure distribution across the screed plate 316 may also determine an amount of compaction of the paving material 128 and the grade of the paving material 128.

Further, the angle of attack A may impact an amount of wear experienced by the screed plate 316. For example, in conditions in which the angle of attack A is too low, excessive wear may occur along or proximate a front edge of the screed plate 316. In conditions in which the angle of attack A is too high, excessive wear may occur along a rear edge of the screed plate 316.

In conventional paving systems, the operator of the paving system typically sets the angle of attack A of the screed plate 316 at the beginning of a paving operation. The operator typically does not adjust the angle of attack A or the pressure distribution along the screed plate 316 during the paving operation. Conventional road pavers and/or screed systems are not configured to determine and/or monitor the angle of attack A or the pressure distribution along the screed plate 316 during a paving operation.

Under some operating conditions, the angle of attack A may change during the paving operation, making the angle of attack A different than a target angle of attack. For example, if the tow arms 116 are positioned so that the tow point 130 is above a pin 131 of the screed system 108, the tow arms 116 may push upward on the screed system 108 and the pressure sensors 324 may read a pressure that is above a threshold at the front of the screed system 108. Under such conditions, it may be desirable to increase the angle of attack A. Likewise, if the tow arms 116 are positioned so that the tow point 130 is below the pin 131 of the screed system 108, the tow arms 116 may pull downward on the screed system 108 and the pressure sensors 324 may read a pressure that is above a threshold at the back of the screed system 108. Under such conditions, it may be desirable to decrease the angle of attack A. In some aspects, the angle of attack A may be dynamically changed in real time or substantially real time.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A screed plate assembly, comprising:
a screed plate;
at least one sensor, each sensor:
  mechanically coupled to the screed plate, and
  operative to sense a pressure on the screed plate and to communicate the sensed pressure; and
at least one actuator, each actuator:
  mechanically coupled to the screed plate; and
  operative to receive an input related to adjusting an angle of attack (AoA) of the screed plate based on the sensed pressure, and to adjust the AoA of the screed plate based on the received input independent of adjusting an AOA of an other screed plate.

2. The screed plate assembly of claim 1 wherein:
the at least one sensor is further operative to communicate the sensed pressure as sensed pressure data via electronic communication,
the at least one actuator is further operative to receive the input as an AoA control command via electronic communication; and
the screed plate assembly further comprises a computer system, the computer system:
  in electronic communication with the at least one sensor and the at least one actuator, and
  operative to receive the communicated sensed pressure data from the at least one sensor, determine the AoA control command based on the received sensed pressure data, and transmit the determined AoA control command to the at least one actuator.

3. A method for operating a screed plate assembly, comprising:

providing a screed plate assembly, comprising:
  a screed plate;
  at least one sensor, each sensor:
    mechanically coupled to the screed plate, and
    operative to sense a pressure on the screed plate and to communicate the sensed pressure; and
  at least one actuator, each actuator:
    mechanically coupled to the screed plate, and
    operative to receive an input related to adjusting an angle of attack (AoA) of the screed plate based on the sensed pressure, and to adjust the AoA of the screed plate based on the received input independent of adjusting an AOA of an other screed plate;
sensing, by each sensor, a pressure on a particular screed plate;
communicating, by each sensor, the sensed pressure;
receiving, by each actuator, an input related to controlling an angle of attack (AoA) of the particular screed plate; and
controlling, by the at least one actuator, the AoA of the particular screed plate based on the received input independent of controlling an AOA of an other screed plate.

4. The method of claim 3, wherein:

the at least one sensor is further operative to communicate the sensed pressure as sensed pressure data via electronic communication, the at least one actuator is further operative to receive the input as an AoA control command via electronic communication;

the screed plate assembly further comprises a computer system, the computer system:
  in electronic communication with the at least one sensor and the at least one actuator, and
  operative to receive the communicated sensed pressure data from the at least one sensor, determine the AoA control command based on the received sensed pressure data, and transmit the determined AoA control command to the at least one actuator; and the communicating comprises communicating, by each sensor, the sensed pressure data to the computer system and receiving, by the computer system the communicated sensed pressure data;

the method further comprises:
  determining, by the computer system, the AoA control command based on the received sensor pressure data; and
  transmitting, by the computer system, the determined AoA control command to the at least one actuator.

5. A screed unit, comprising:

a frame; and a plurality of screed plate assemblies, each screed plate assembly:
  attached to the frame, and
  comprising:
    a screed plate;
    at least one sensor, each sensor:
      mechanically coupled to the screed plate; and
      operative to sense a pressure on the screed plate and to communicate the sensed pressure;
    at least one actuator, each actuator:
      mechanically coupled to the screed plate; and operative to receive an input related to adjusting an angle of attack (AoA) of the screed plate based on the sensed pressure, and to adjust the AoA of the screed plate based on the received input independent of adjusting an AOA of an other screed plate.

6. The screed unit of claim 5, wherein:

the at least one sensor is further operative to communicate the sensed pressure as sensed pressure data via electronic communication, and the at least one actuator is further operative to receive the input as an AoA control command via electronic communication; and the screed unit further comprises a computer system, the computer system:
  in electronic communication with the at least one sensor and the at least one actuator, and
  operative to receive the communicated sensed pressure data from the at least one sensor, determine the AoA control command based on the received sensed pressure data, and transmit the determined AoA control command to the at least one actuator.

7. A method for operating a screed unit, comprising:

providing a screed unit, the screed unit comprising:
  a frame; and
  a plurality of screed plate assemblies, each screed plate assembly:
    attached to the frame, and
    comprising:
      a screed plate;
      at least one sensor, each sensor:
        mechanically coupled to the screed plate; and
        operative to sense a pressure on the screed plate and to communicate the sensed pressure;
      at least one actuator, each actuator:
        mechanically coupled to the screed plate; and
        operative to receive an input related to adjusting an angle of attack (AoA) of the screed plate based on the sensed pressure, and to adjust the AoA of the screed plate based on the received input independent of adjusting an AOA of an other screed plate;
sensing, by each sensor, a pressure on a particular screed plate;
communicating, by each sensor, the sensed pressure;
receiving, by each actuator, an input related to controlling an angle of attack (AoA) of the particular screed plate; and
controlling, by the at least one actuator, the AoA of the particular screed plate based on the received input independent of controlling an AOA of an other screed plate.

8. The method of claim 7, wherein:

the at least one sensor is further operative to communicate the sensed pressure as sensed pressure data via electronic communication, the at least one actuator is further operative to receive the input as an AoA control command via electronic communication;

the screed plate assembly further comprises a computer system, the computer system:
  in electronic communication with the at least one sensor and the at least one actuator, and
  operative to receive the communicated sensed pressure data from the at least one sensor, determine the AoA control command based on the received sensed pressure data, and transmit the determined AoA control command to the at least one actuator;

the communicating comprises communicating, by each sensor, the sensed pressure data to the computer system and receiving, by the computer system the communicated sensed pressure data;

the method further comprises:

determining, by the computer system, the AoA control command based on the received sensor pressure data; and transmitting, by the computer system, the determined AoA control command to the at least one actuator.

9. A paver, comprising:

a screed unit, comprising:

a frame; and a plurality of screed plate assemblies, each screed plate assembly:

attached to the frame, and comprising:

a screed plate;

at least one sensor, each sensor:

mechanically coupled to the screed plate; and operative to sense a pressure on the screed plate and to communicate the sensed pressure;

at least one actuator, each actuator:

mechanically coupled to the screed plate; and operative to receive an input related to adjusting an angle of attack (AoA) of the screed plate based on the sensed pressure, and to adjust the AoA of the screed plate based on the received input independent of adjusting an AOA of an other screed plate.

10. The paver of claim 9, wherein:

the at least one sensor is further operative to communicate the sensed pressure as sensed pressure data via electronic communication, and the at least one actuator is further operative to receive the input as an AoA control command via electronic communication; and the screed unit further comprises a computer system, the computer system:

in electronic communication with the at least one sensor and the at least one actuator, and operative to receive the communicated sensed pressure data from the at least one sensor, determine the AoA control command based on the received sensed pressure data, and transmit the determined AoA control command to the at least one actuator.

11. A method for operating a paver, comprising:

providing a screed unit, the screed unit comprising:

a frame; and a plurality of screed plate assemblies, each screed plate assembly:

attached to the frame, and comprising:

a screed plate;

at least one sensor, each sensor:

mechanically coupled to the screed plate; and operative to sense a pressure on the screed plate and to communicate the sensed pressure;

at least one actuator, each actuator:

mechanically coupled to the screed plate; and operative to receive an input related to adjusting an angle of attack (AoA) of the screed plate based on the sensed pressure, and to adjust the AoA of the screed plate based on the received input independent of adjusting an AOA of an other screed plate;

sensing, by each sensor, a pressure on a particular screed plate;

communicating, by each sensor, the sensed pressure;

receiving, by each actuator, an input related to controlling an angle of attack (AoA) of the particular screed plate; and controlling, by the at least one actuator, the AoA of the particular screed plate based on the received input independent of controlling an AOA of an other screed plate.

12. The method of claim 11, wherein:

the at least one sensor is further operative to communicate the sensed pressure as sensed pressure data via electronic communication, the at least one actuator is further operative to receive the input as an AoA control command via electronic communication;

the screed plate assembly further comprises a computer system, the computer system:

in electronic communication with the at least one sensor and the at least one actuator, and operative to receive the communicated sensed pressure data from the at least one sensor, determine the AoA control command based on the received sensed pressure data, and transmit the determined AoA control command to the at least one actuator;

the communicating comprises communicating, by each sensor, the sensed pressure data to the computer system and receiving, by the computer system the communicated sensed pressure data;

the method further comprises:

determining, by the computer system, the AoA control command based on the received sensor pressure data; and transmitting, by the computer system, the determined AoA control command to the at least one actuator.

* * * * *